(12) United States Patent
Montojo et al.

(10) Patent No.: US 8,676,223 B2
(45) Date of Patent: Mar. 18, 2014

(54) BACKHAUL COMMUNICATION FOR INTERFERENCE MANAGEMENT

(75) Inventors: Juan Montojo, San Diego, CA (US); Aleksandar Damnjanovic, Del Mar, CA (US); Durga Prasad Malladi, San Diego, CA (US); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 12/052,691

(22) Filed: Mar. 20, 2008

(65) Prior Publication Data

US 2008/0233967 A1     Sep. 25, 2008

Related U.S. Application Data

(60) Provisional application No. 60/896,843, filed on Mar. 23, 2007.

(51) Int. Cl.
*H04W 72/00*     (2009.01)
*H04W 40/00*     (2009.01)
*H04W 4/00*     (2009.01)

(52) U.S. Cl.
USPC ........ 455/452.2; 455/453; 455/446; 370/328; 370/338

(58) Field of Classification Search
USPC .......... 455/452, 453, 522; 370/238, 352, 328; 709/227, 224; 375/133
See application file for complete search history.

(56) References Cited

U.S. PATENT DOCUMENTS

| 7,738,907 | B2 * | 6/2010 | Xiao et al. ................ 455/522 |
| 2001/0053695 | A1 | 12/2001 | Wallentin |
| 2002/0026560 | A1 | 2/2002 | Jordan et al. |

(Continued)

FOREIGN PATENT DOCUMENTS

| JP | 9275582 A | 10/1997 |
| JP | 2006526325 A | 11/2006 |

(Continued)

OTHER PUBLICATIONS

3GPP TSG-RAN WG2 AH Meeting Jun. 27-30, 2006; "Uplink Scheduling Based on Neighbour Cell Load", Qualcomm Europe, Cannes, France.

(Continued)

*Primary Examiner* — Nizar Sivji
(74) *Attorney, Agent, or Firm* — Dalei Dong

(57) ABSTRACT

System(s) and method(s) are provided for inter-cell interference management in a wireless communication system. A base station perform interference management by conveying and receiving load indicator messages over a backhaul communication link to disparate neighboring base stations that serve interfering mobile stations. Reporting of load indicators takes place according to a reporting policy that is event-based, and accounts for variations of interference metrics over available time-frequency resources. Communication with neighboring base stations is limited to a monitoring interference set, which can be determined statically, according to deployment characteristics of a wireless network, or the set can be adjusted dynamically according to a set of received UL signals or a set of DL CQI measurement reports. Reporting policy and interference set can be autonomously adapted to optimize backhaul traffic as well as interference control.

48 Claims, 13 Drawing Sheets

(56) References Cited

U.S. PATENT DOCUMENTS

| | | |
|---|---|---|
| 2002/0171677 A1 | 11/2002 | Stanford-Clark |
| 2005/0059408 A1* | 3/2005 | Tiedemann et al. ....... 455/452.1 |
| 2006/0073791 A1 | 4/2006 | Senarath et al. |
| 2006/0126555 A1* | 6/2006 | Wang et al. .................. 370/328 |
| 2006/0209721 A1 | 9/2006 | Mese et al. |
| 2006/0285503 A1 | 12/2006 | Mese et al. |
| 2008/0260000 A1* | 10/2008 | Periyalwar et al. ........... 375/133 |
| 2009/0280749 A1 | 11/2009 | Tanno et al. |

FOREIGN PATENT DOCUMENTS

| | | |
|---|---|---|
| JP | 2008533924 | 8/2008 |
| RU | 2120183 C1 | 10/1998 |
| RU | 2277762 | 6/2006 |
| WO | WO9427381 A1 | 11/1994 |
| WO | WO0232179 A1 | 4/2002 |
| WO | WO2004042954 A1 | 5/2004 |
| WO | 2004100468 A1 | 11/2004 |
| WO | WO2006009551 A1 | 1/2006 |
| WO | WO2006099548 A1 | 9/2006 |
| WO | 2006109435 A1 | 10/2006 |

OTHER PUBLICATIONS

3GPP TSG RAN WG3 Meeting #52 May 8-12, 2006; "Revised Text Proposal for TR R3.018 on RRM in LTE", Siemens, Shanghai, China.

3GPP TSG-RAN WG3 Meeting #53, Aug. 28-Sep. 1, 2006; "Congestion Status Indication in E-UTRA", Ericsson, Tallinn, Estonia.

3GPP TSG-RAN WG2 #55. Oct. 9-13, 2006; "Uplink Scheduling With Inter-Cell Interference Control", Lucent Technologies, Seoul, Korea.

3GPP TR 25.814 V7.1.0; "3rd Generation Partnership Project; Technical Specification Group Radio Access Network; Physical Layer Aspects for Evolved Universal Terrestrial Radio Access (UTRA)" (Release 7) (Sep. 2006).

3GPP TS 36.300 V1.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN): Overall Description; Stage 2" (Release 8) (Mar. 2007).

International Search Report—PCT/US08/057906, International Search Authority—European Patent Office—Sep. 5, 2008.

Written Opinion—PCT/US08/057906, International Search Authority—European Patent Office—Sep. 5, 2008.

Taiwan Search Report—TW097110309—TIPO—Jul. 7, 2011.

* cited by examiner

BACKHAUL COMMUNICATION FOR INTERFERENCE MANAGEMENT

CLAIM OF PRIORITY UNDER 35 U.S.C. §119

This Application for patent claims the benefit of U.S. Provisional Application Ser. No. 60/896,843 filed on Mar. 23, 2007, and entitled "BACKHAUL-BASED INTER-CELL INTERFERENCE CONTROL METHODS AND SYSTEMS." The entirety of this application is expressly incorporated herein by reference.

BACKGROUND

I. Field

The subject specification relates generally to wireless communications and, more particularly, to inter-cell interference management through a wired backhaul communication network within a wireless communication system.

II. Background

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area; e.g., a cell or sector, and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area; e.g., cell or sector, of that base station can be interested in receiving one, more than one or all the data streams carried by the composite stream. Likewise, a mobile terminal can transmit data to the base station or another mobile terminal.

Communication between base station and mobile terminal or between mobile terminals can be degraded due to channel condition variations or interference caused by other terminals which can be communicating within a same coverage area or in a disparate cell or sector. Typically, variations of channel quality associated with changes in interference can be managed by a base station through power control, rate adaptation, or data-packet format reconfiguration configuration for one or more access terminals. The adjustment generally relies upon receiving an interference indicator which is conventionally received over the air interface. Such a reporting mechanism increases communication traffic, deteriorating cell or sector throughput, with the ensuing deterioration on quality of service. Furthermore, poor channel conditions associated with the need to convey an interference indicator, further exacerbate deterioration of cell capacity, and can lead to inefficient resource adjustment(s). There is therefore a need in the art for an interference management mechanism(s) that preserves cell or sector capacity while effectively controlling interference.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

System(s) and method(s) are provided for inter-cell interference management in a wireless communication system. A base station perform interference management by conveying and receiving load indicator messages over a backhaul comunication link to disparate neighboring base stations that serve interfering mobile stations. Reporting of load indicators takes place according to a reporting policy that is event-based, and accounts for variations of interference metrics over available time-frequency resources. Communication with neighboring base stations is limited to a monitoring interference set, which can be determined statically, according to deployment characteristics of a wireless network, or the set can be adjusted dynamically based on a set of DL channel quality indicator (CQI) measurements reports from a set of access terminals or a set of received UL signals, or a combination thereof. Reporting policy and interference set can be autonomously adapted to optimize backhaul traffic as well as interference control.

In an aspect, the subject specification discloses a method for managing interference in a wireless system, the method comprising: generating a first uplink (UL) interference metric; generating a load indicator according to a reporting policy; conveying a set of load indicators through a backhaul communication wired link; receiving a set of load indicators through a backhaul communication wired link; and rescheduling a set of communication resources according to the received load indicators to mitigate a second UL interference metric.

In another aspect, a device that operates in a wireless system is described, the device comprising: a processor configured to receive an uplink (UL) signal; to generate an UL interference metric; to generate a load indicator according to a reporting policy; and to convey a set of load indicators through a backhaul communication link; and a memory coupled to the processor.

In yet another aspect, the subject innovation discloses an apparatus that operates in a wireless environment, the apparatus comprising: means for receiving an uplink signal; means for determining an UL interference metric; means for generating a load indicator according to a reporting policy; means for conveying a set of load indicators through a backhaul communication link; means for receiving a set of load indicators through a backhaul communication link; and means for rescheduling a set of communication resources according to the received load indicators to mitigate an UL interference metric.

In a yet further aspect, the subject specification discloses a computer program product comprising a computer-readable medium including: code for causing at least one computer to determine an uplink interference metric; code for causing the at least one computer to generate a load indicator according to a reporting policy; code for causing the at least one computer to convey a set of load indicators through a backhaul communication link; code for causing the at least one computer to receive a set of load indicators through a backhaul communication link; and code for causing the at least one computer to schedule a set of communication resources according to the received load indicators to mitigate an UL interference metric.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
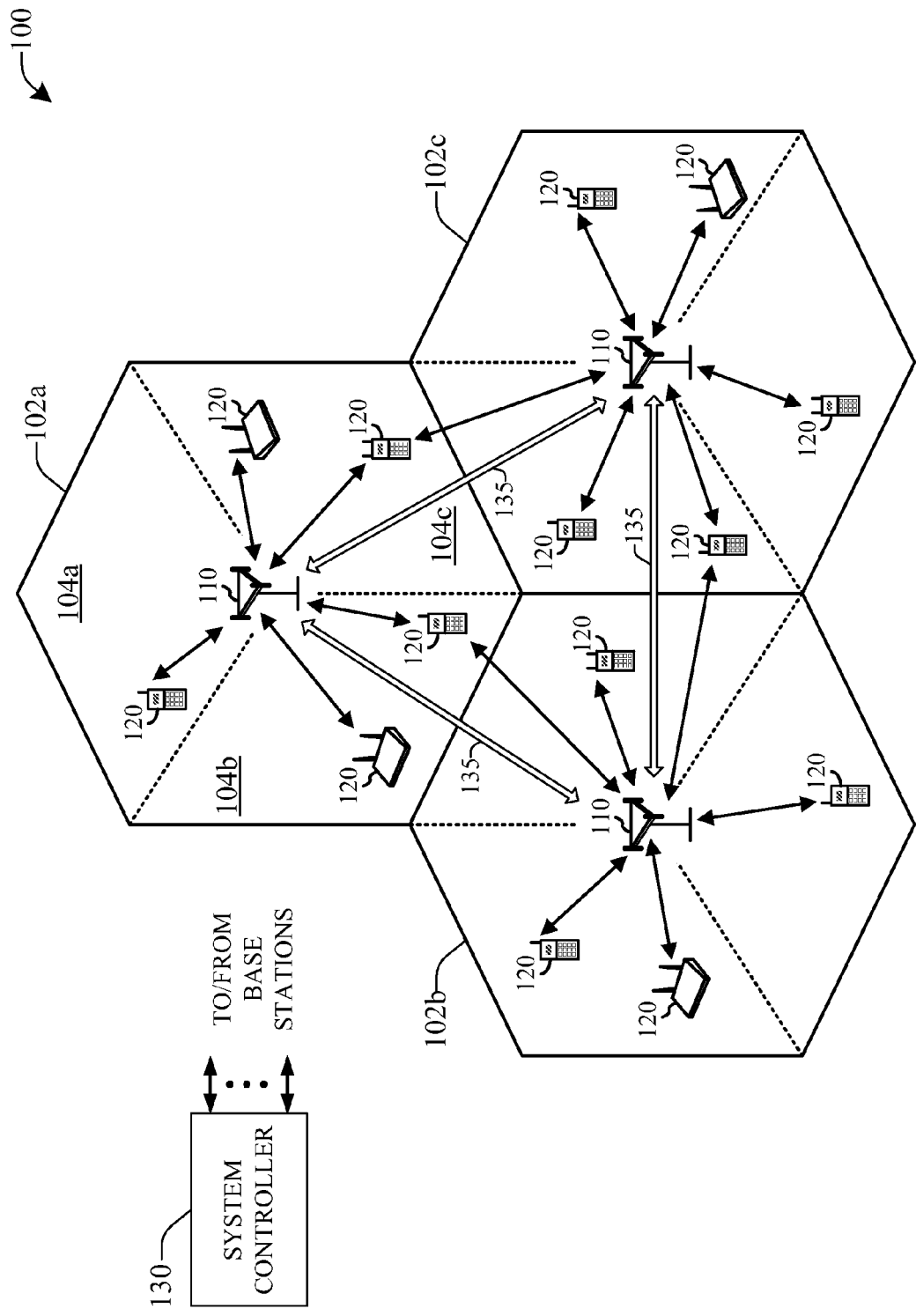
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. Backhaul network communication 135 can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2A:
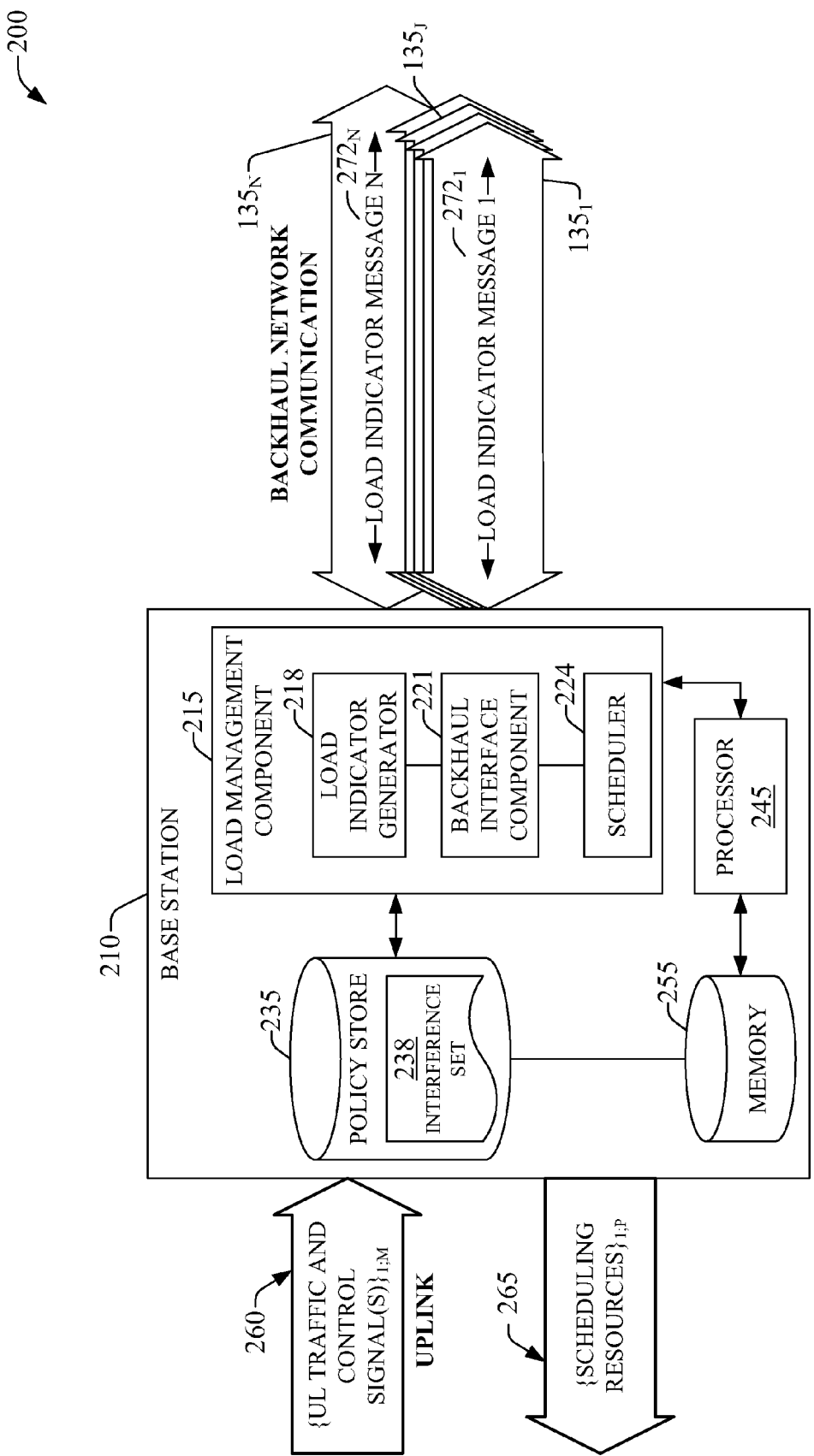
FIGS. 2A and 2B illustrate block diagrams of example systems that facilitate inter-cell interference management according to aspects described in the subject specification.
Figure 2B:
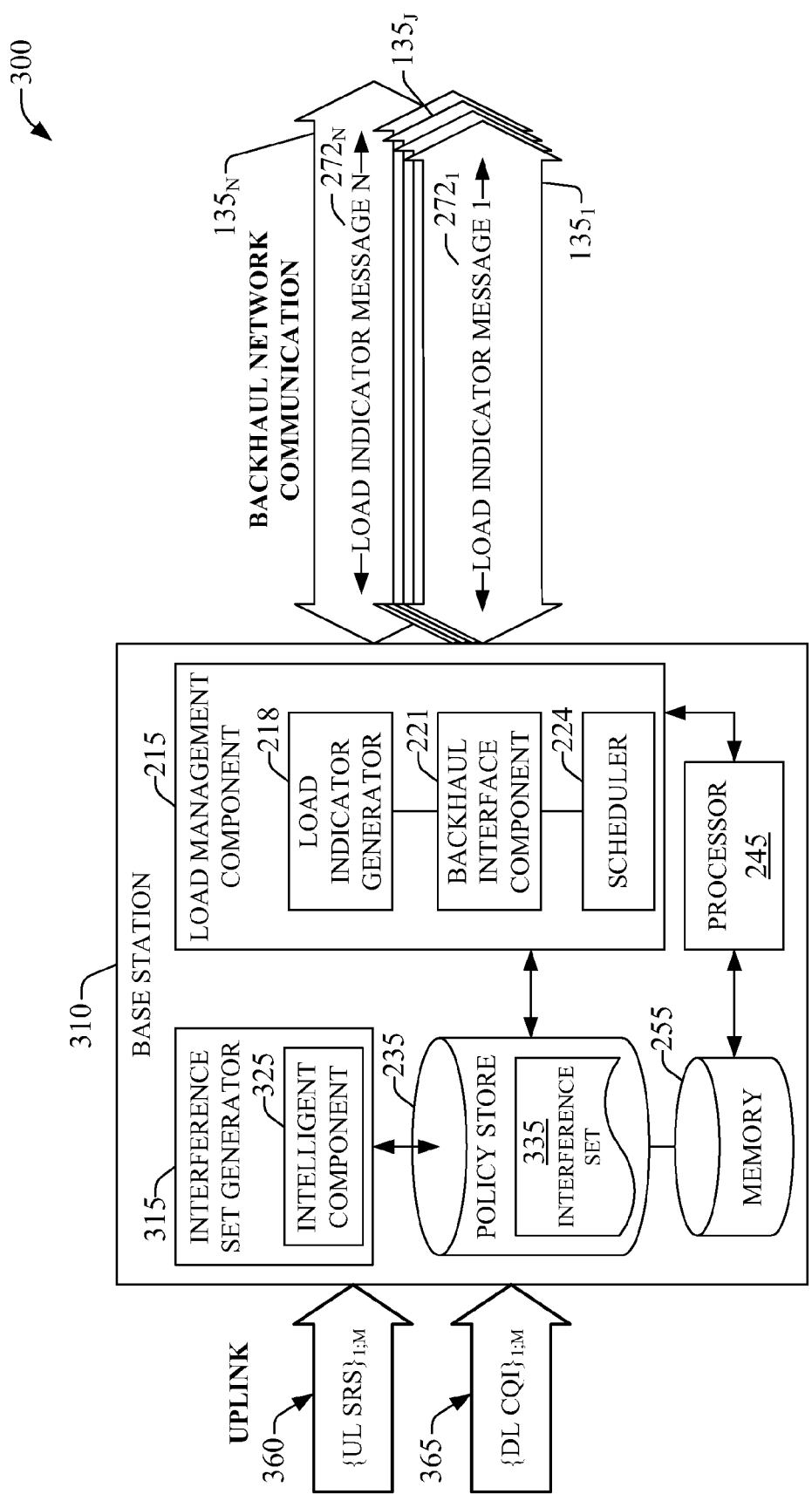

FIGS. 2A and 2B illustrate block diagrams of two example systems that facilitate inter-cell interference management through backhaul network communication according to aspects described in the subject specification.

FIG. 2A is a block diagram 200 of an example system that facilitates inter-cell interference management. In system 200, a base station 210 includes a load management component 215 and a policy store 235. Load management component 215 includes a load indicator generator component 218 (or load indicator generator 218 as indicated in FIG. 2A and other drawings and portions of the subject specification for simplicity) which can determine an interference metric in a set of neighboring sectors, or cells (not shown), termed herein "interference set." To determine performance metric, a set of uplink (UL) traffic and control signals 1-M 260, originating in M (positive integer) mobile stations operating in neighboring cells. It should be appreciated that the M access terminals (e.g., terminals 120) and the "interference set" of neighboring base stations can be disjoint, in that at least a portion of access terminals are not served by a base station in the interference set. It should be appreciated that the M mobile stations correspond to those terminals that can acquire base station 210 and establish traffic or control communication therewith.

Identification, or an indication, of a current interference set is typically available in a policy store 238. In an aspect, interference set 238 can be determined statically, according to deployment features. Determination of interference set 238 is generally conducted by a service provider that operates the base station. It is noted that determination of the interference can also be dynamically adapted based at least in part on the magnitude of performance metrics associated with received UL signals.

In an aspect, an interference metric can be an average interference over thermal noise (IOT), a carrier-signal-to-interference ratio (C/I), a signal-to-noise ratio (SNR), or a signal-to-noise-and-interference ratio (SINR). An additional or alternative interference metric is an interference over thermal noise metric, which reflects the level of interference present in a cell with respect to background thermal noise. It is to be noted that in the case of uplink channel, the foregoing interference metrics can be measured through UL control and UL traffic signals (signals 260) received at a base station (e.g., base station 210). It should be appreciated that load indicator generator 218 can determine an interference metric over various time-frequency resources: An average interference metric can be determined over disparate subbands and subcarriers, as well as time resources such as radio frames, subframes, time slots, and superframes. The level of granularity with respect to frequency-time resources of interference measurements, and ensuing interference averages, can be dictated by (a) intrinsic factors, such as time and frequency resolution of an instrument/electronics used to measure interference, or (b) extrinsic factors, e.g., dynamic reassignment, or rescheduling, of frequency resources, like reassignment of operational bandwitdth in a wireless system that support flexible bandwidth capabilities, e.g., LTE or UMB; reconfiguration of frequency reuse, and so on. Furthermore, load indicator generator 218 can produce load indicator messages associated with the various degrees of granularity in time-frequency resources utilized to generate the load indicators.

A generated interference metric can be employed to determine whether a load indicator message is to be generated. Such a determination can conducted through a response metric, which can assess relative changes of the interference metric with respect to previously determined interference metrics. Such a response is a differential response, which can ensure that meaningful variations in inter-cell interference are indicated to neighboring base stations. In addition, the response metric can be determined according to a comparison among a current interference metric, or performance metric or channel quality indicator (CQI), and a threshold value. Generally, the response metric is dictated by a policy determined by a service provider, which can be stored in the policy store. When a response metric associated with a measured inter-cell interference metric warrants, according to a reporting policy, generation of a load indicator message, load indicator management component 215 conveys a set of load indicator messages $272_1$-$272_N$ to N neighboring base station, or cells, via backhaul interface component 221 which facilitates delivery of the set of load indicator messages via backhaul network communication links $135_1$-$135_N$ associated with the N neighboring base stations (not shown).

Load indicator messages can comprise Q bits (Q a positive integer) conveyed in a data packet. In addition, depending on the interference level to be reported and time-frequency resources (e.g., a set of sub-bands, a set of time slots, a set of radio frames, etc.) associated with a metric employed to determine the load indicator message, the format thereof can comprise substantially any format known in the art for communication of information in packet-switched networks, e.g., short message service; encrypted/un-encrypted cookie files; and so on. A load indicator message can also include a time stamp that reveals an instance at which the load indicator (e.g., $272_N$) was determined.

It should be appreciated that base station 210 can also receive a set of load indicators from base stations to which BS 210 is a neighboring cell. In an aspect, when a base station, e.g., BS 210, receives a backhaul communication carrying a load indicator, a scheduler component 224 (or scheduler 224, for simplicity) which can reside in load management component 215, schedules communication resources (e.g., 265) for a set of P mobile stations served by the base station, e.g., 210, that receives the load indicator. The latter facilitates inter-cell interference management through backhaul communication, since rescheduled resources 265 can include reduced power spectral densities (PSDs; via a reduction in allocated power, or by increasing an assigned set of sub-carriers for the specific mobile that is rescheduled), adapted data packet formats compatible with lower PSD, and so on. Scheduled communication resources can be estimated through an UL interference metric associated with the set of P mobile stations served by the base station.

An advantage of conducting interference management according to the aspects disclose hereinbefore, includes preservation of cell throughput or capacity, as communication resources to convey load indicators are not utilized to that end. In addition, by exploiting the backhaul communication a base station, and ultimately a service provides, possesses the flexibility to control inter-cell interference originating in a substantially arbitrary set of base stations.

It is to be noted that processor 245 is configured to perform at least a portion of the functional actions, e.g., computations, declarations, assignments, decisions, and substantially any other functional operation necessary to implement the functionality of substantially any component in base station 210. Memory 255 can retain respective data structures, code instructions, algorithms, and the like, that can be employed by processor 245 when conferring base station 210 its functionality.

FIG. 2B is a block diagram of an example system that facilitates interference management over a backhaul communication network. In an aspect, system 300, facilitates adaptive determination of interference sets, as well as adaptive trigger-based reporting policies, which can be utilized to optimize both traffic in the backhaul communication link $135_1$-$135_N$, as well as to maintain a substantially optimal cell throughput, or capacity. In system 300, base station 310 can receive a set of M UL sounding reference signals (SRSs) 360, which can be a sequence transmitted in a narrowband or a broadband. Such SRSs facilitate a determination of an interference metric in the substantially the same manner as discussed above, through load management component 215. In addition, interference metrics can be assessed via broadband or narrowband SRS strength indicator (RSSI), which typically conveys the effects of interference, indicating the strength of a signal relative to average background noise, e.g., $E_S/I_0$, the measured background noise includes intra-cell and inter-cell interference; broadband or narrowband SRS over thermal noise (RSOT), typically conveyed as $E_S/N_0$. It is to be appreciated that a further interference metric includes interference over thermal noise which can be measured or determined from measurements of RSSI and RSOT. It is to be appreciated; as discussed above, that interference over thermal noise measurements can also be accomplished utilizing UL traffic and UL control signals (e.g., signals 260).

Furthermore, sounding references signals 360 can carry a payload indication (e.g., a K-bit word, with K a positive integer) that indicates a base station that serves a user equipment that conveys an SRS. In an aspect, base station 310 can utilize a look-up table, which can be stored in memory 255 or policy store 235 to identify the neighboring base station. It should be appreciated that a service provider can configure base station 310 with information necessary to make such a determination. Once a set of M base stations are identified, an interference metrics are generated via load management component 215, the latter can determine an interference set to monitor or control; e.g., by selecting a subset of base stations with associated interference metrics that are within a predetermined threshold value $I_{TH}$ from a maximum value determined by load indicator generator 215. It should be appreciated that other metrics to determine an interference set can be employed. For example, UL path loss can be utilized to determine the interference to be controlled, by determining a sounding reference signal reference power (RSRP) which indicates signal strength ($E_S$) and reveals UL attenuation associated with attenuation of radiation conveyed in the UL channel. Thus the discriminating metric for formation of the interference set can be RSRP in conjunction with a threshold value which can be determined statically or adaptively.

Additionally, or alternatively, base station 310 can utilize a set of M DL CQI reports received from the set of M mobile terminals. Such reports can also be employed to determine an interference set 335, or to refine a previously determined interference set 335. The interference set comprises a set of base stations neighboring base station 210.

In another aspect, an interference set can be inferred via an intelligent component 325 residing in an interference set generator 315. In particular, intelligent component can utilize historic data regarding interference set(s) 335 to determined an optimized interference set associated with base stations that serve mobile stations that convey $\{UL\ SRS\}_{1;M}$ 360. Similarly, intelligent component can infer a disparate interference set, or refine the interference set inferred through UL SRSs, based on historic values of reported DL CQI. Moreover, interference set generator 315 can determine an interference set based on cost-benefit analysis associated with the cost to convey a substantive number of load indicator messages $272_1$-$272_N$, e.g., large N, with the benefit to control inter-cell interference accurately. To that end, intelligent component can employ historical records of backhaul communication and resource scheduling decision to determine an optimized interference set. Furthermore, such a cost-analysis can also incorporate an inferred reporting policy (which can be stored in policy store 235) that optimizes backhaul link data packet queue size and data packet traffic, in order to optimize utilization of the backhaul link particularly in situations in which the size of the interference is large (e.g., first, second and third NN). It should be appreciated that such historic values are available to interference set generator 315 via policy store 235 and memory 255.

In addition, intelligent component 325 can be utilized to infer a specific source (e.g., a mobile terminal; not shown) of interference based on analysis of a set of DL channel quality reports (e.g., $\{DL\ CQI\}_{1;M}$ 365) received over the air at the base station (e.g., base station 210), a set of load indicators (e.g., $272_1$-$272_N$) received over a backhaul communication link (e.g., link 135), and a set of scheduled communication resources determined by a scheduler like scheduler 224. Such inference can be accomplished through machine learning or pattern(s) extraction from, and correlations among, current and historic data on DL channel quality reports, scheduled resources and load indicator responses as conveyed by a set of neighboring base stations. Identification of a specific source of inter-cell interference can facilitate optimization of resource allocation, cell throughput, and quality of service in general.

As employed hereinbefore, in connection with adaptation of a reporting policy and an interference set, and in other portions of the subject description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above and other automated aspects relevant to the subject innovation described herein, an intelligent component (not shown) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

It is to be noted that processor 245 is configured to perform at least a portion of the functional actions, e.g., computations, declarations, assignments, decisions, and substantially any other functional operation necessary to implement the functionality of substantially any component in base station 310. Memory 255 can retain respective data structures, code instructions, algorithms, and the like, that can be employed by processor 245 when conferring base station 310 its functionality.

Figure 3:
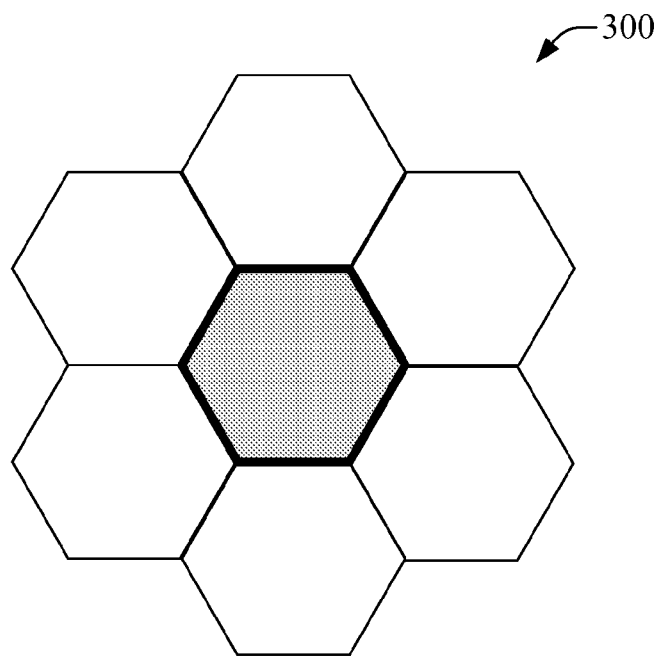
FIG. 3 illustrates example sets of inter-cell interference sets in accordance with aspects described herein.
Figure 3:
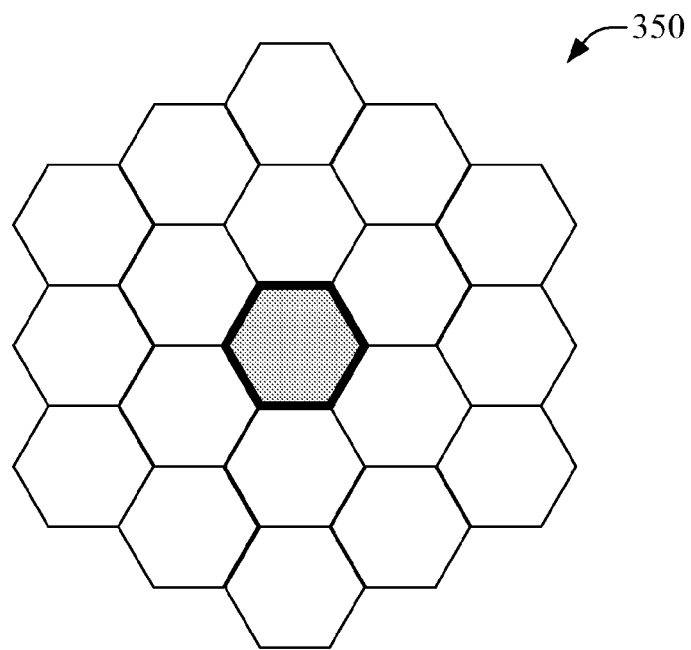

FIG. 3 illustrates two sets of interference sets statically determined based on geographic, of floor plan, features of a wireless communication system; e.g., network 100. In an aspect, interference set 300 includes all first nearest neighbors (NN) of a reference base station (cell in grey) in a floor plan, or coverage geographic region, that has been partition in a triangular lattice. It should be appreciated that a first NN criterion of a managing cell (e.g., base station 210) can be applied to substantially any deployment that displays a regular pattern. In addition, for deployments that fail to be periodic, which can be a typical scenario in metropolitan areas, a cut-off distance can be adopted to determined an interference set, retaining all base stations within an "interference radius" which can be fixed by a service provider. Diagram 350 illustrates an interference set that comprises all first NN and second NN. Similar criteria that include sets of base stations based upon a tiered NN selection can be implemented to establish interference sets.

Figure 4:
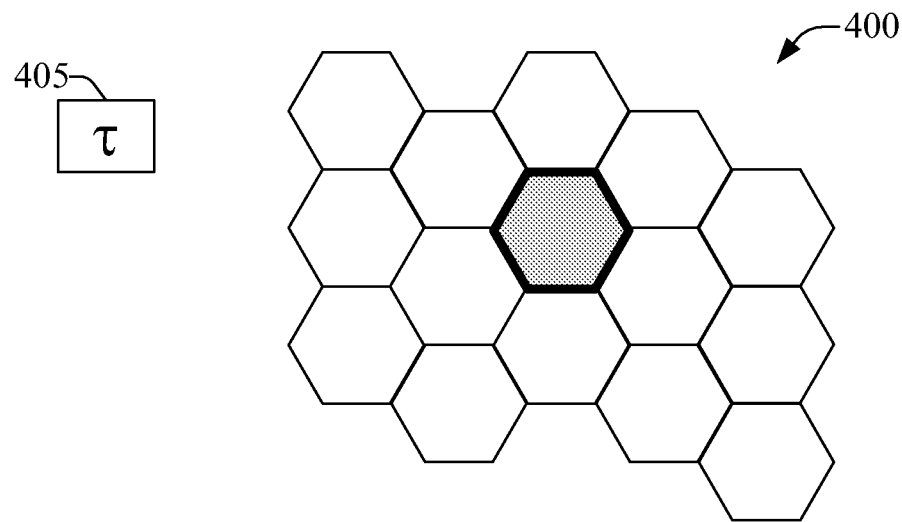
FIG. 4 illustrates dynamic configuration of an example interference set according to aspects set forth in the subject specification.
Figure 4:
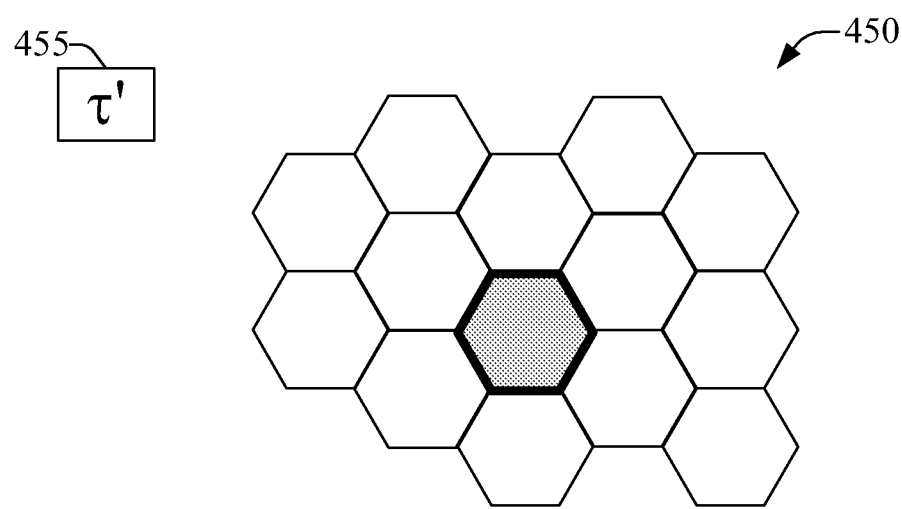

FIG. 4 illustrates dynamic determination of interference sets. Such a determination can be based at least in part on UL channel conditions, wherein all neighboring cells that deliver an UL signal with CQI above a threshold $CQI_{TH}$ are included in the interference set; threshold CQITH can be established by a service provider, either statically or adaptively (via an intelligent component like component 212). It is to be appreciated that a cutoff based on UL channel quality can better reflect variations in communication (e.g., channel) conditions arising from changes in (1) meteorological conditions (e.g., heavy rain or snow); (2) environmental conditions such as increased foliage in spring and summer, real state development, operation in a mountainous region, and so on; (3) seasonal changes, e.g., increased vehicular traffic at specific times of day, which can lead to increased data packet collisions in view of user equipment accumulation; and the like. Set 400 depicts a specific interference set associated with specific channel conditions at a specific time t 405, while set 450 illustrates a change in the interference set arising from changes in channel quality at a disparate time τ' 455. In an aspect, $\tau' > \tau$.

Figure 5:
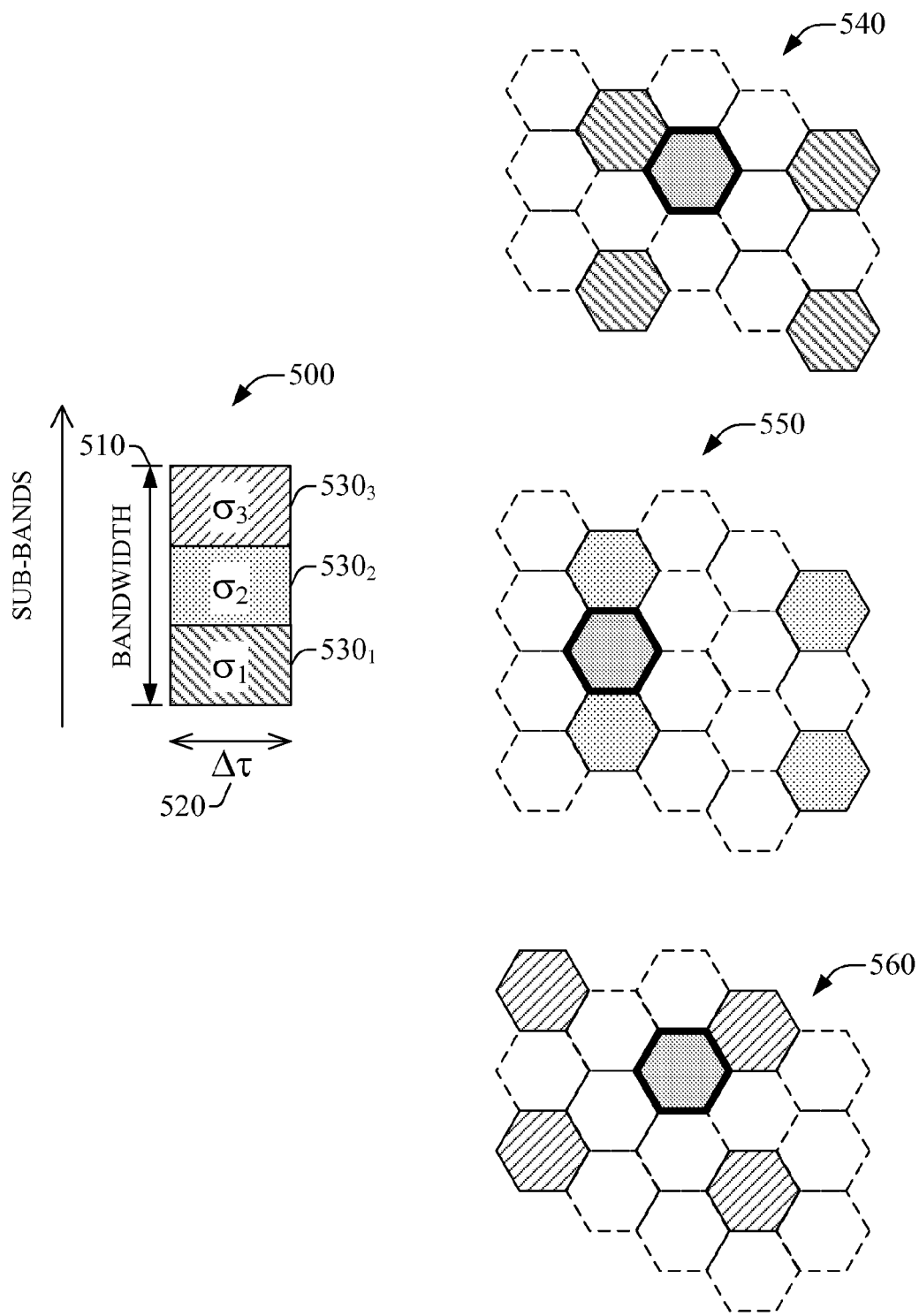
FIG. 5 illustrates example interference sets based at least in part on a sub-band configuration for a wireless communication system.

FIG. 5 illustrates example interference sets based at least in part on a sub-band configuration for a wireless communication system. Diagram 500 displays an illustrative frequency partition of a wireless system bandwidth 510, the partition spans a time interval Δτ 520 which can correspond, for example, to a predetermined number of radio frames or slots, or substantially any other characteristic time interval associated with a technology utilized for wireless communication (e.g., LTE, UMB, WiMax, etc.). Time interval Δτ 520 is typically stored in a policy store, and can be statically assigned by a service provider or it can be determined adaptively through an intelligent component (e.g., component 325) in three sub-bands $530_1$-$530_3$. It should be appreciated that while sub-bands $530_1$-$530_3$ are illustrated as comprising a same sub-bandwidth, the number of carriers spanned by each sub-band can be different.) In an aspect, a service provider, via a system controller or network management component can implement a specific frequency plan for communication coverage like a specific frequency re-use scheme. Frequency re-use or substantially any other form of frequency planning can be exploited to determine an interference set. For example, interference set 540 comprises a set of four neighboring cells that operate in frequency sub-band $\sigma_1$ $530_1$. It should be appreciated that such a set associated with $\sigma_1$ can change after time Δτ elapses, when a frequency plan, e.g., 500, can change. Similarly, set 550 is associated with four neighbor cells that operate in sub-band $\sigma_2$ $530_2$; and set 560 comprises four cells that operate in sub-band $\sigma_3$ $530_3$.

It should be appreciated that (i) sets 540, 550, and 560 possess a same number of neighbor cells, such a scenario is typical of a set selection based on frequency-reuse, wherein a specific number of cells N (with N a positive integer) operate in a given sub-band in a pattern that is periodically repeated throughout substantially all regions of coverage. Frequency plans that do not rely on frequency-reuse, can lead to frequency-dependent interference sets populated with disparate numbers of neighbor cells.

Figure 6:
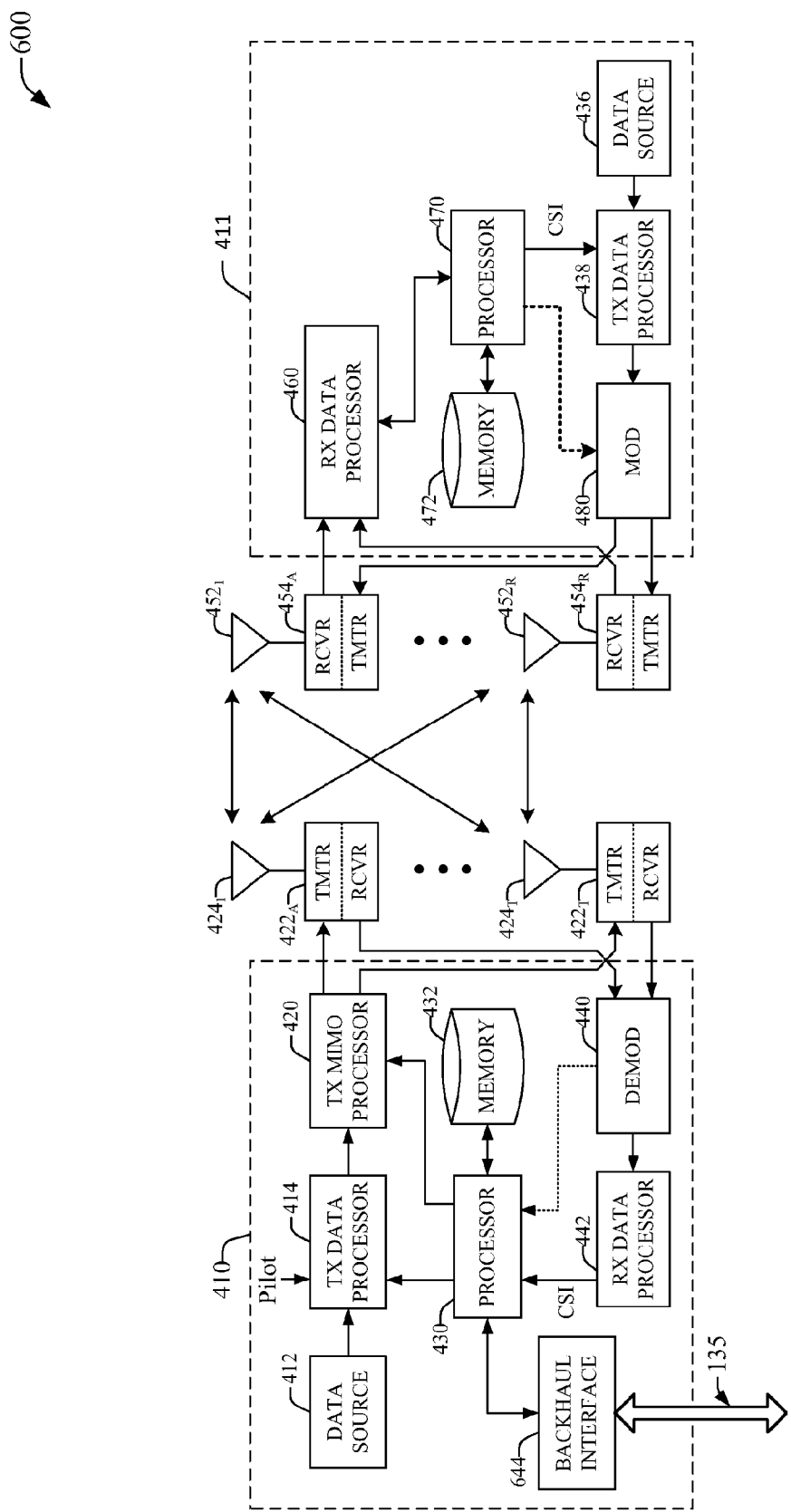
FIG. 6 is a block diagram of an example embodiment of a transmitter system and a receiver system in MIMO operation that can exploit aspects described in the subject specification.

FIG. 6 is a block diagram 600 of an embodiment of a transmitter system 410 (such as base station 210) and a receiver system 411 (e.g., access terminal(s) 120) in a multiple-input multiple-output (MIMO) system that can provide for cell/sector communication in a wireless communication environment in accordance with one or more aspects set forth herein. At the transmitter system 410, traffic data for a number of data streams can be provided from a data source 412 to transmit (TX) data processor 414. In an embodiment, each data stream is transmitted over a respective transmit antenna. TX data processor 414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 430, the instructions as well as the data may be stored in memory 432. In addition, in accordance with an aspect of the present innovation, a transmitter can switch modulation schemes depending on a computed delta value in response to an indication of excessive OSI.

The modulation symbols for all data streams are then provided to a TX MIMO processor 420, which may further process the modulation symbols (e.g., OFDM). TX MIMO processor 420 then provides $N_T$ modulation symbol streams to $N_T$ transceiver (TMTR/RCVR) $422_A$ through $422_T$. In certain embodiments, TX MIMO processor 420 applies beamforming weights (or precoding) to the symbols of the data streams and to the antenna from which the symbol is being transmitted. Each transceiver 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $422_A$ through $422_T$ are then transmitted from $N_T$ antennas $424_1$ through $424_T$ respectively.

At receiver system 411, the transmitted modulated signals are received by $N_R$ antennas $452_1$ through $452_R$ and the received signal from each antenna 452 is provided to a respective transceiver (RCVR/TMTR) $454_A$ through $454_R$. Each transceiver $454_A$-$454_R$ conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ transceivers $454_A$-$454_R$ based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410. A processor 470 periodically determines which precoding matrix to use, such a matrix can be stored in memory 472. Processor 470 formulates a reverse link message comprising a matrix index portion and a rank value portion. Memory 472 may store instructions that when executed by processor 470 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 438, which also receives traffic data for a number of data streams from a data source 436, modulated by a modulator 480, conditioned by transceiver $454_A$ through $454_R$, and transmitted back to transmitter system 410.

At transmitter system 410, the modulated signals from receiver system 411 are received by antennas $424_1$-$424_T$, conditioned by transceivers $422_A$-$422_T$, demodulated by a demodulator 440, and processed by a RX data processor 442 to extract the reserve link message transmitted by the receiver system 411. Processor 430 then determines which pre-coding matrix to use for determining the beamforming weights and processes the extracted message. In addition, processor 430 facilitates operation of a backhaul interface 644 that conveys and received information over a backhaul communication link 135, which is typically a wired link or optically switched link. Link 135 comprises a set of links associated with various transmitters (e.g., base stations 110) that operate substantially in the same manner as transmitter 410. In an aspect or operating backhaul interface 644, processor 430 schedules data packets to be transmitted over backhaul link(s) 135, adapts packet format according to traffic in the backhaul link(s) 135, and implements substantially any trigger-based reporting policy available for communication of inter-cell interference indicators or messages in accordance with aspects described herein.

Single-user MIMO mode of operation corresponds to the case in which a single receiver system 411 communicates with transmitter system 410, as illustrated in FIG. 6 and according to the operation described above. In such a system, the $N_T$ transmitters $424_A$-$424_T$ (also known as TX antennas) and $N_R$ receivers $452_A$-$452_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to min $\{N_T, N_R\}$. A MIMO channel formed by the $N_T$ transmit and $N_R$ receive antennas may be decomposed into $N_V$ independent channels, which are also referred to as spatial channels, where $N_V \leq \min \{N_T, N_R\}$. Each of the $N_V$ independent channels corresponds to a dimension.

In one aspect, transmitted/received symbols with OFDM, at tone ω, can be modeled by:

$$y(\omega) = \underline{H}(\omega)c(\omega) + n(\omega). \quad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(w) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 410, and $N_V$ can be scheduled at the discretion of the transmitter (e.g., access point 210) based at least in part on channel conditions, e.g., other sector interference indications received through backhaul interface 644, and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 410 allocates to transmit each data stream $N_V$. It should be appreciated that such a power gain matrix can be a resource that is assigned to access terminal 120, and it can be managed through adjustment of offsets as described herein.

In system 600 (FIG. 6), when $N_T = N_R = 1$, the system reduces to a single-input single-output (SISO) system that can provide for sector communication in a wireless communication environment in accordance with one or more aspects set forth herein.

Figure 7:
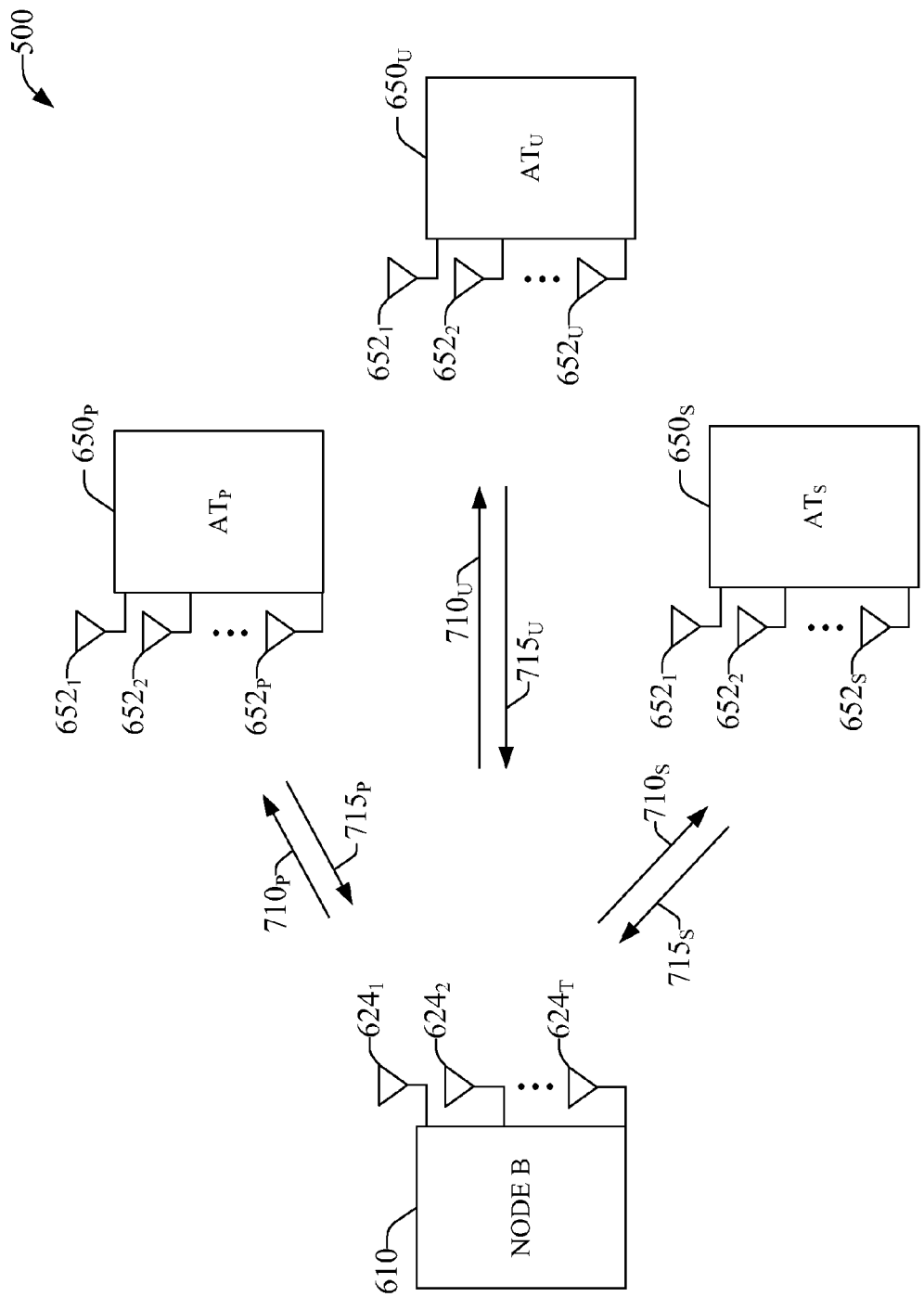
FIG. 7 is a block diagram that illustrates an example MU-MIMO.

FIG. 7 illustrates an exemplary multiple-user MIMO system 500 in which three ATs $650_P$, $650_U$, and $650_S$ communicate with an access point 610. Access point has $N_T$ TX antennas $624_1$-$624_T$, and each of the ATs has multiple RX antennas; namely, $AT_P$ has $N_P$ antennas $652_1$-$652_P$, $AT_U$ has $N_u$ antennas $652_1$-$652_u$, and $AP_S$ has $N_s$ antennas $652_1$-$652_S$. Communication between terminals and the access point is effected through uplinks $715_P$, $715_U$, and $715_S$. Similarly, downlinks $710_P$, $710_U$, and $710_S$ facilitate communication between access point 610 and terminals $AT_P$, $AT_U$, and $AT_S$, respectively. Additionally, communication between each terminal and base station is implemented in substantially the same manner, through substantially the same components, as illustrated in FIG. 6 and its corresponding description. Because terminals can be located in substantially different locations within the cell serviced by access point 610, each user equipment $650_P$, $650_U$, and $650_S$ has its own matrix channel $H_\alpha$ and response matrix $H_\alpha$ (α=P, U, and S), with its own associated channel conditions (e.g., carrier over interference metrics) and rank. Intra-cell interference can be present due to the plurality of users present in the cell serviced by the base station 210, and inter-cell interference is also included as base station 210 can communicate with terminals in neighboring cells (see FIG. 1). Although illustrated with three terminals in FIG. 7, it should be appreciated that a MU-MIMO system can comprise any number of terminals, indicated below with index k. Each of the access terminals $650_P$, $650_U$, and $650_S$ can respond to indications of excessive other-sector interference, and each can communicate to access point 610 one or more adjusted communication resources, offsets for adjusting a scheduled resource, as well as information for decoding adapted data packet formats employed for transmission in view of the OSI indication. As discussed above, access point 610 can re-schedule resources for each of the terminals 650$_P$, 650$_U$, and 650$_S$ accordingly and independently of each other's resource assignment.

In one aspect, transmitted/received symbols with OFDM, at tone w and for user k, can be modeled by:

$$y_k(\omega) = H_k(\omega)c_k(\omega) + H_k(\omega)\Sigma' C_m(\omega) + n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., access point 610) to the other users in the cell.

Figure 8A:
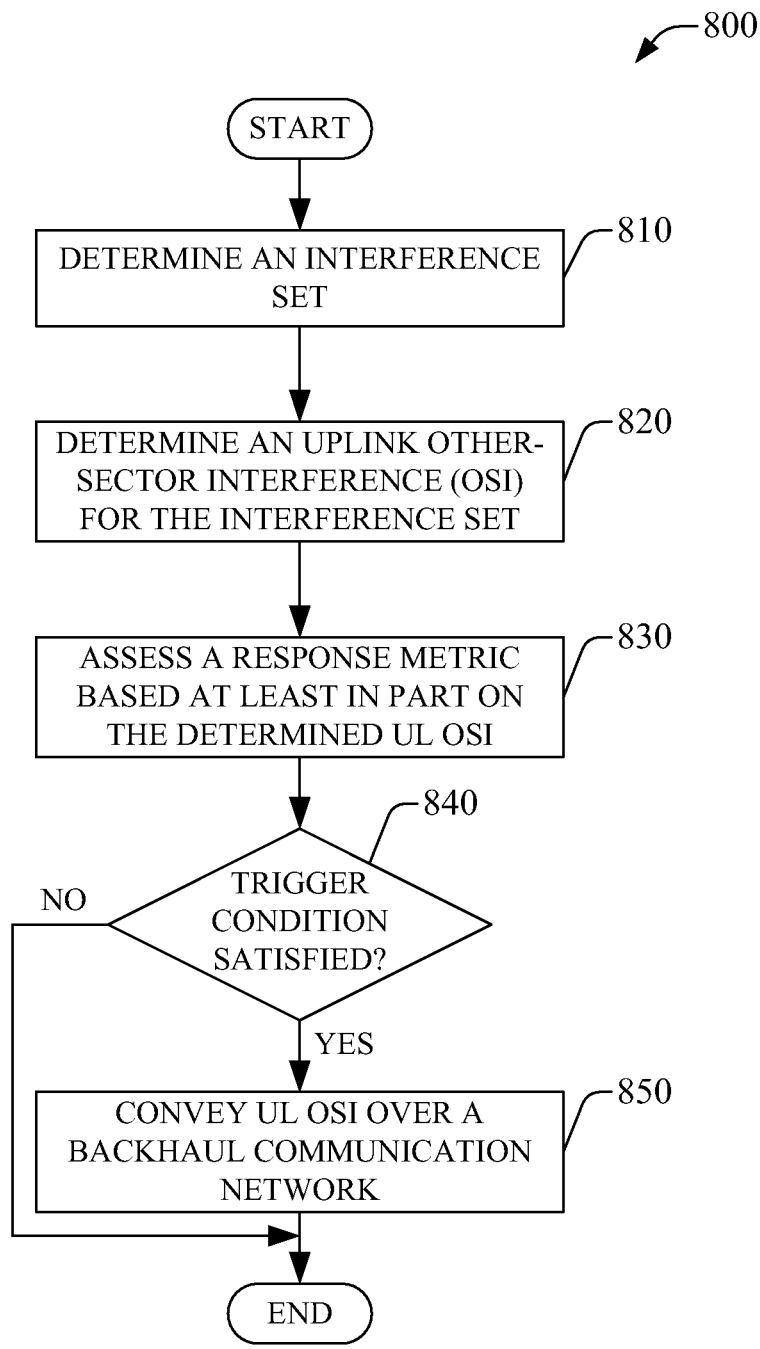
FIGS. 8A and 8B present flowcharts of example methods for managing inter-cell interference in accordance with aspects disclosed herein.
Figure 8B:
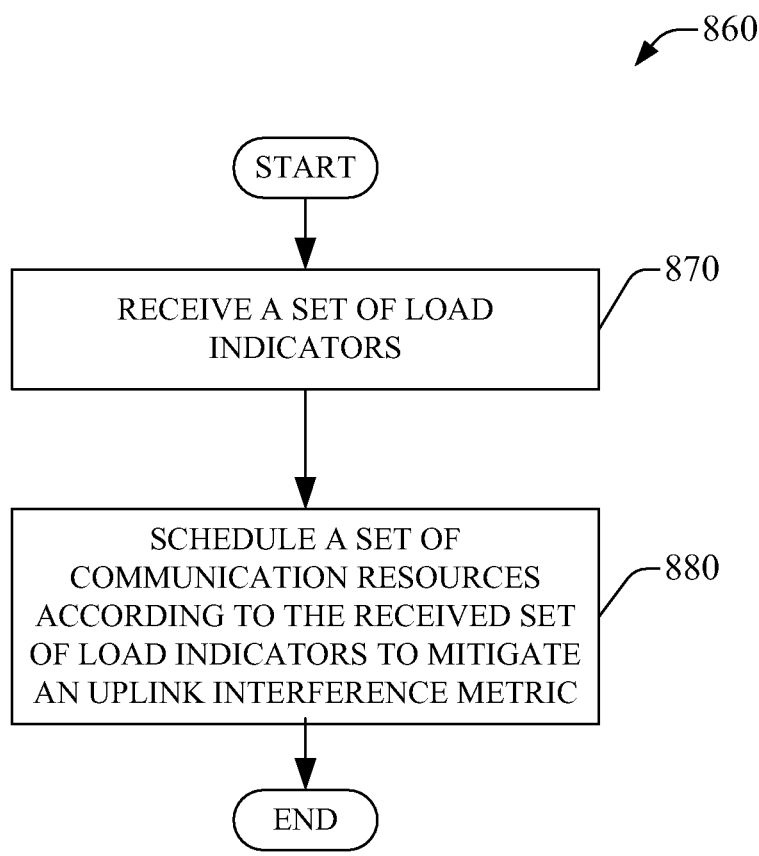
Figure 9:
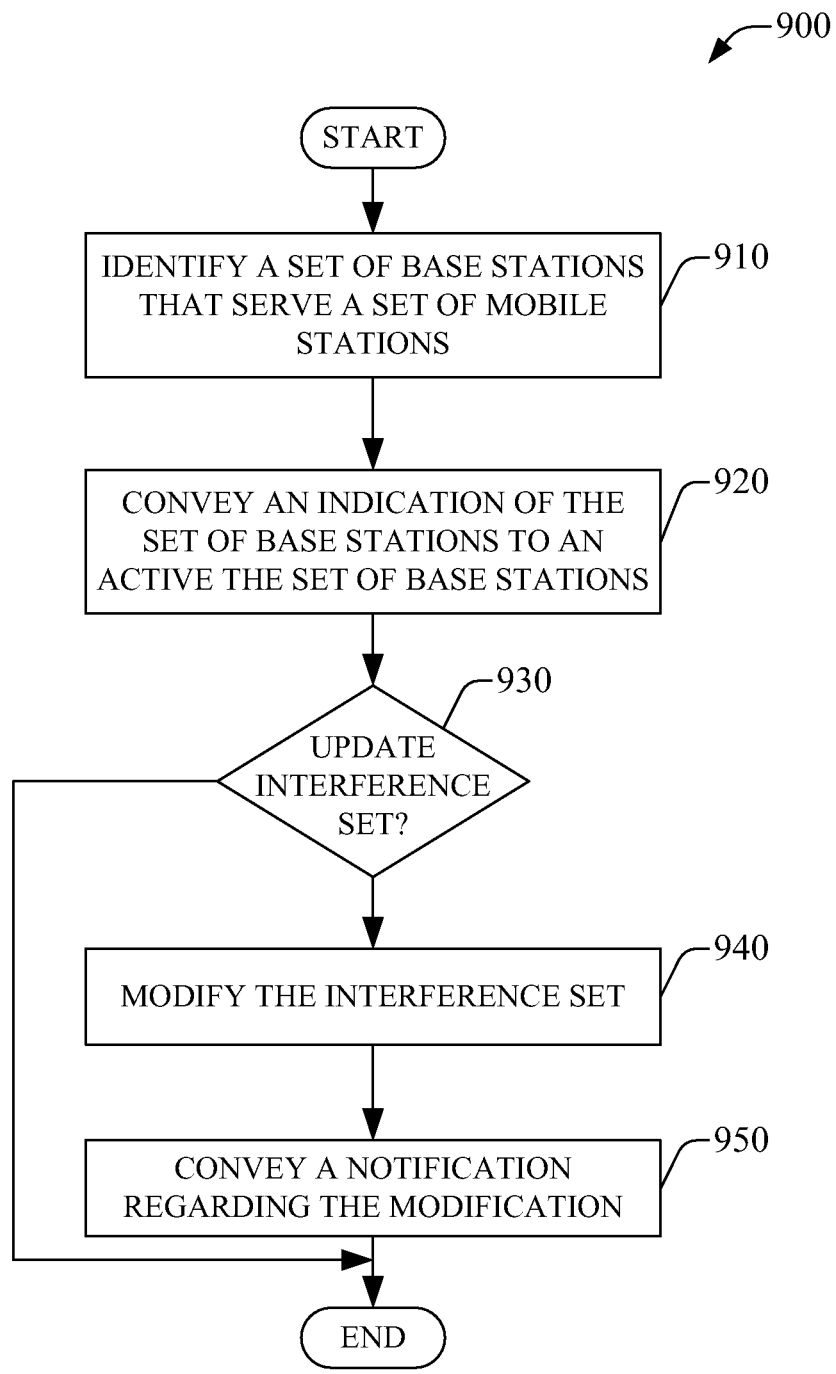
FIG. 9 presents a flowchart of an example method for establishing an interference set according to aspects set forth herein.
Figure 10:
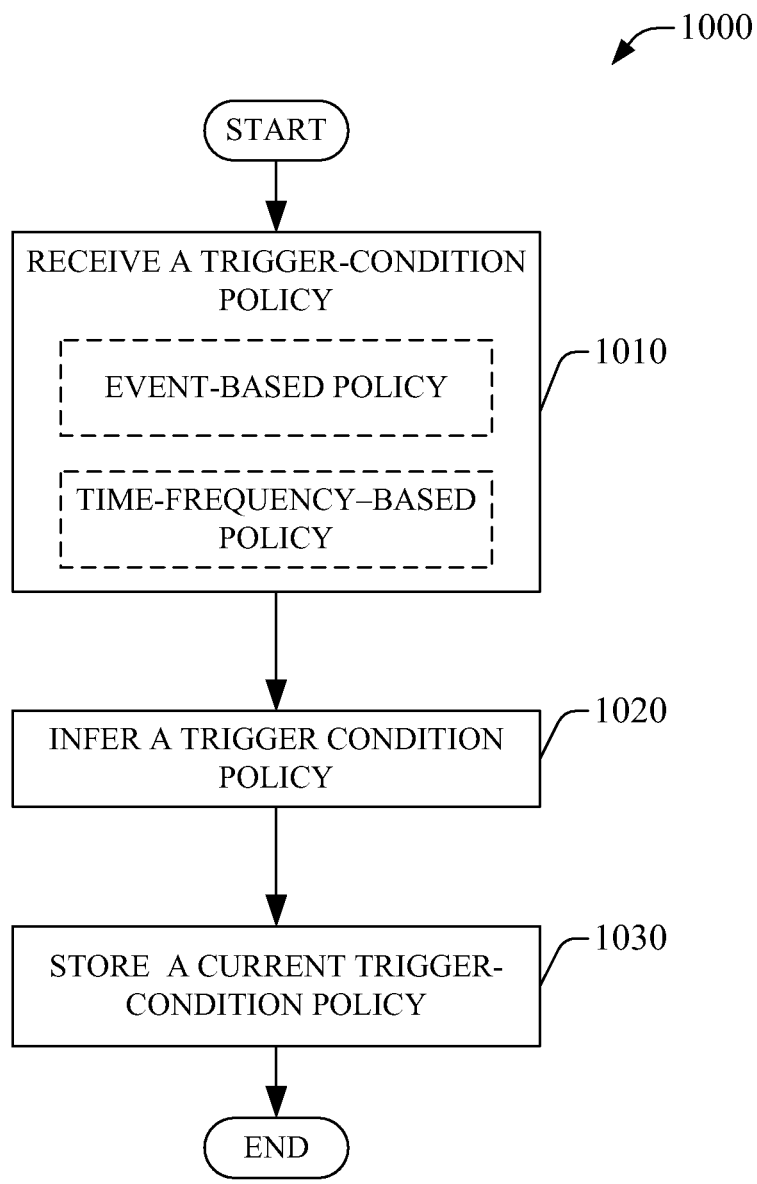
FIG. 10 presents a flowchart of an example method for establishing a policy that dictates a policy for reporting an inter-cell interference indicator.

In view of the example systems, and associated aspects, presented and described above, methodologies for flexible channel quality indicator reporting that may be implemented in accordance with the disclosed subject matter can be better appreciated with reference to the flowcharts of FIGS. 8, 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). It should be further appreciated that the methodologies disclosed hereinafter and throughout the subject specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 8A presents a flowchart of an example method 800 for managing inter-cell interference. Generally, method 800 can typically be exploited by a base station to maintain a level of cell throughput; peak data rate, minimum data rate, or average data rate; communication latency, etc., that is compatible with QoS standards determined by a service provider that operates a wireless system that includes the base station. At 810, an interference set is determined. In an aspect, as discussed above determination can be static, taking place according to base station deployment features (e.g., floor plan) of the wireless system. Alternatively, or in addition, the determination can by agile, or dynamic, with an interference set of base stations evolving (e.g., adding, dropping members of an interference set) in time according to a set of channel quality indicators (e.g., an interference-to-thermal noise ratio, a signal-to-interference ratio, a signal-to-noise ratio, a signal-to-interference-and-noise ratio, and so on) received, or measured via received UL sounding reference signals or traffic data packets, by a base station. It should be appreciated that a base station can be configured with a fail-safe interference set which can be utilized as an initialization set, or in conditions that make it difficult to receive or measure channel conditions; e.g., base stations in the interference set become inoperable. Determination can also be determined based at least in part on frequency planning (e.g., frequency reuse).

At 820, an other sector interference (OSI), or load, indicator is determined for the set of base stations in the interference set. Such determination can be accomplished through a load indicator generator 325. At 830, a response metric is assessed based at least in part on the determined OSI. In an aspect, a response metric can include requests for OSI indicators that can be place by a subset of base stations in the interference set. In addition, a response metric can correspond to an evaluated change in OSI—either a change across a full system bandwidth or a change associated with specific sub-bands—with respect to a previous OSI determination. As an example, a specific cell/sector load level is reached, a specific intra-cell or inter-cell interference level is detected, new system information is scheduled, and so on.

At 840, a trigger condition is checked to assess whether a backhaul message is to be conveyed. In the affirmative case, an OSI indicator is conveyed, e.g., reported, at act 850 through backhaul communication (e.g., X2 interface in LTE) which is a point-to-point communication among base stations (e.g., access points 110) via a backbone of a wired or fiber optic network. For example, T1/E1 lines or other links of the T-carrier/E carrier protocol, and/or packet-based internet protocol. Advantages of utilizing backhaul communication to convey a load indicator include avoiding traffic on the cell served by the base station that conveys the indicator. Reporting a load indicator via a triggered-based mechanism communication (e.g., act 840) can mitigate excessive load in the backhaul communication wired link.

FIG. 8B presents a flowchart of an example method 860 for managing inter-cell interference through scheduling of communication resources to control uplink (UL) interference. Typically method 860 is implemented by a base station and complements method 800. At act 870, a set of load indicators are received. In an aspect, such the set of load indicators is received by a base station through a backhaul communication link, and is generated by a set of neighboring base stations. For example, method 800 can be employed to produce the set of load indicators. At act 880, communication resources are scheduled according to the received set of load indicators to mitigate a UL interference metric. Typically, the UL interference is inflicted in a neighboring cell to the cell served by the base station that schedules the communication resources.

In an embodiment, methods may be performed for collecting UL and DL channel condition metrics. A set of uplink channel condition metrics, or handover metrics, are measured. Such metrics generally comprise those depicted in FIG. 2B. In an aspect, such channel condition metrics can be measured periodically, in a cycle comprising a specific number of slots, frames, or superframes, or it can be measured upon an occurrence of a predetermined event. In another aspect, measurements can be time-averaged, over a specific number of time resources or frequency resources (e.g., a sub-band). Moreover, UL channel condition metrics can also be determined as an average over a specific set of time-frequency resources, like resource blocks. The set of UL channel condition metrics are conveyed.

FIG. 9 illustrates an example method 900 for establishing an interference set in accordance with certain aspects of the present disclosure. At 910, a set of base stations that service a set of mobile stations is identified. At 920, an indication of the set of base stations is conveyed. At 930, a determination is made if an interference set needs to be updated. At 940, the interference set may be modified. At 950, a notification regarding the modification is conveyed.

FIG. 10 presents a flowchart of an example method 1000 for establishing a policy that dictates a policy for reporting an inter-cell interference indicator. At 1010, a trigger-condition policy is received. Such a policy can be an event-based policy, wherein changes to inter-cell interference, and other communication indicators (e.g., scheduled communication resources like operational bandwidth, data packet format, allocated power, etc.) can trigger communication of a load indicator report. Additionally, trigger-condition policies can be based on variation of performance metrics, e.g., UL CQI, as a function of time (e.g., changes over a predetermined period of time, or changes that occur periodically) and frequency (e.g., changes in a specific set of sub-carriers utilized for OFDMA). At 1020, a trigger-condition policy is inferred autonomously based, for example, on previous policies, on historic data associated with a determined and a received set of performance metrics, and cost-benefit analysis as measured by the load of the backhaul communication link, or a packet queue size associated with load indicators scheduled to be conveyed over the backhaul link, and so on. In an aspect, an intelligent component can infer a policy that optimizes a set of queue sizes in order to preserve an optimized traffic over the backhaul network. At 1030, a current trigger-condition policy, either received from a network management component or inferred employing artificial intelligence techniques, is stored.

Figure 11:
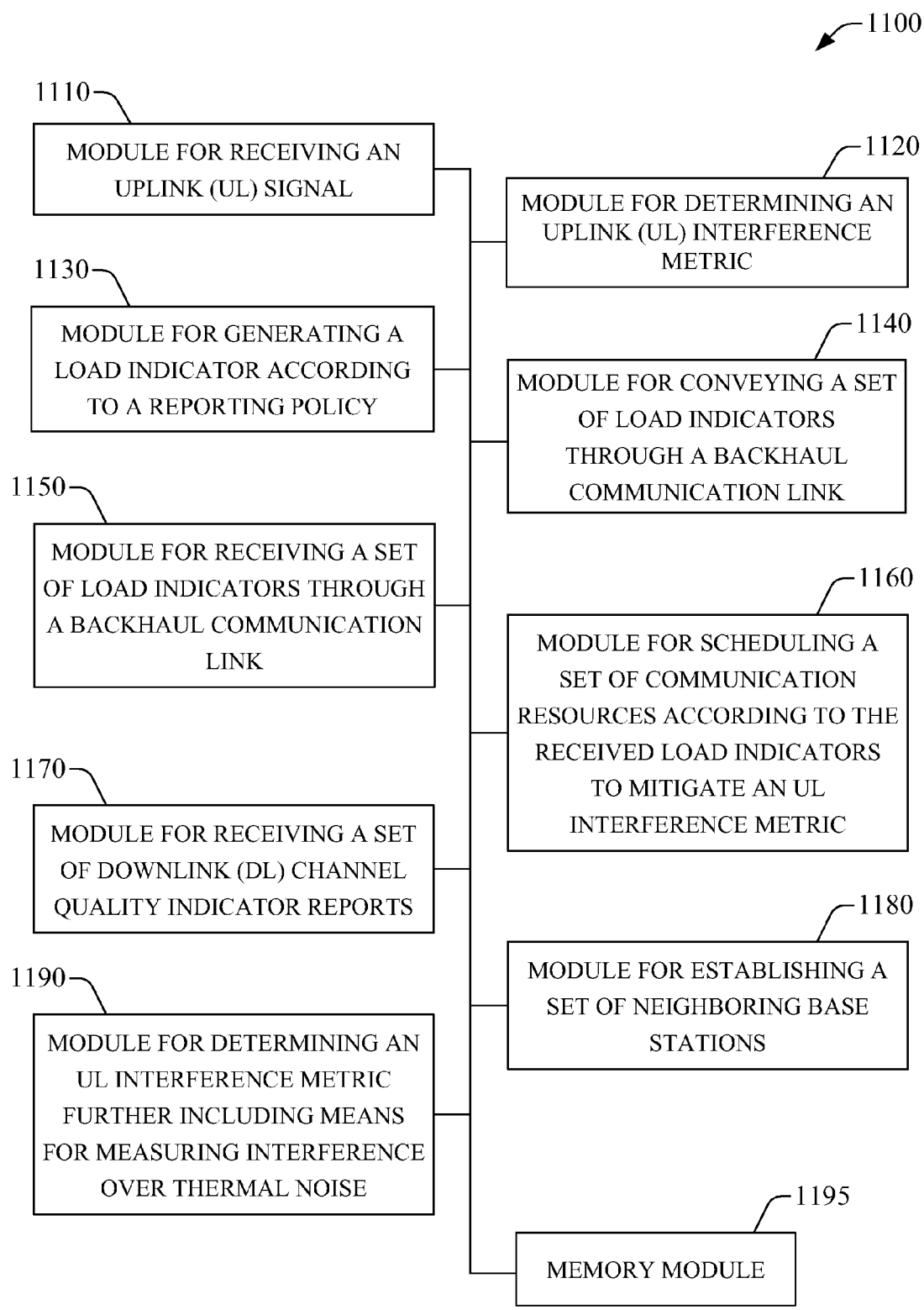
FIG. 11 illustrates a block diagram of a system 1100 that enables inter-cell interference according to aspects described in the subject specification.

FIG. 11 illustrates a block diagram of a system 1100 that enables inter-cell interference according to aspects described in the subject specification. System 1100 may include a module 1110 for receiving an uplink (UL) signal; a module 1120 for determining an UL interference metric; a module 1130 for generating a load indicator according to a reporting policy; a module 1140 for conveying a set of load indicators through a backhaul communication wired link; a module 1150 for receiving a set of load indicators through a backhaul communication wired link; a module 1160 for rescheduling a set of communication resources according to the received load indicators to mitigate an UL interference metric; a module 1170 for receiving a set of downlink (DL) channel quality indicator reports; a module 1180 for establishing a set of neighboring base stations; and a module 1190 for determining an UL interference metric further including means for measuring interference over thermal noise. Modules 1110, 1120, 1130, 1140, 1150, 1160, 1170, 1180, and 1190 can be a processor or any electronic device, and may be coupled to memory module 1195.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the terms "includes," "including," "possess," and possessing" are used in the subject specification, such terms are intended to be inclusive in a manner similar to the term "comprising" as "comprising" is interpreted when employed as a transitional word in a claim.

What is claimed is:

1. A method for managing interference in a wireless system, the method comprising:
   generating a first uplink (UL) interference metric;
   determining whether to generate a load indicator based at least in part on the first UL_interference metric and a reporting policy, wherein determining whether to generate a load indicator comprises evaluating a difference between the first UL interference metric and a third UL interference metric;
   generating the load indicator when it is determined to generate the load indicator;
   conveying a set of the generated load indicators through a backhaul communication wired link;
   receiving a set of load indicators from a set of neighboring base stations through the backhaul communication wired link; and
   scheduling a set of communication resources according to the received set of load indicators to mitigate a second UL interference metric.

2. The method of claim 1, wherein generating the first UL interference metric further comprises receiving an UL sounding reference signal.

3. The method of claim 1, wherein generating the first UL interference metric further comprises receiving an UL traffic signal.

4. The method of claim 1, further comprising receiving a downlink (DL) channel quality measurement report.

5. The method of claim 1, wherein at least one load indicator in the set of the generated load indicators is determined for a set of frequency resources.

6. The method of claim 1, wherein conveying a set of the generated load indicators through a backhaul communication wired link further comprises conveying the set of the generated load indicators to the set of neighboring base stations.

7. The method of claim 6, wherein the set of neighboring base stations is determined by a service provider.

8. The method of claim 6, wherein the set of neighboring base stations is determined through a set of UL performance metrics associated with a set of serving base stations.

9. The method of claim 6, wherein the set of neighboring base stations is determined based at least in part on a set of DL channel quality indicator measurement reports.

10. The method of claim 6, wherein at least one of the load indicators in the set of the generated load indicators includes a time stamp.

11. The method of claim 1, wherein the reporting policy comprises comparing the first UL interference metric with a threshold value.

12. The method of claim 1, wherein the reporting policy comprises responding to a request to receive a load indicator.

13. The method of claim 1, wherein the reporting policy comprises reporting a load indicator message periodically.

14. The method of claim 1, wherein generating the first UL interference metric further comprises measuring an UL signal.

15. The method of claim 14, wherein measuring an UL signal includes measuring interference over thermal noise.

16. The method of claim 1, further comprising inferring the reporting policy based at least in part on historic data on UL interference metrics.

17. The method of claim 1, further comprising inferring the reporting policy based at least in part on a cost-benefit analysis to optimize a backhaul communication link.

18. The method of claim 1, further comprising inferring a source of interference based at least in part on a set of DL channel quality reports, a set of scheduled time-frequency resources, or a set of load indicators.

19. The method of claim 1, wherein the generated load indicator is a P-bit word, with P a positive integer.

20. The method of claim 1, wherein the generated load indicator is a message in a short message service.

21. The method of claim 1, wherein the generated load indicator is a cookie file.

22. The method of claim 1, wherein the third UL metric is obtained prior to generating the first UL metric.

23. A device that operates on a wireless system, comprising:
   a processor configured to receive an uplink (UL) signal, to generate an UL interference metric, to determine whether to generate a load indicator based at least in part on the first UL_interference metric and a reporting policy, wherein determining whether to generate a load indicator comprises evaluating a difference between the first UL interference metric and a third UL interference metric, to generate the load indicator when it is determined to generate the load indicator, to convey a set of the generated load indicators through a backhaul communication wired link, to receive a set of load indicators from a set of neighboring base stations through a backhaul communication link, and to schedule a set of communication resources according to the received set of load indicators; and
   a memory coupled to the processor.

24. The device of claim 23, the processor further configured to receive a downlink (DL) channel quality measurement report.

25. The device of claim 23, wherein to generate the first UL interference metric includes to measure interference over thermal noise.

26. The device of claim 23, wherein to convey a set of the generated load indicators through a backhaul communication wired link further comprises to convey the set of the generated load indicators to a predetermined set of base stations.

27. The device of claim 26, wherein the predetermined set of base stations is established by a service provider.

28. The device of claim 27, wherein the predetermined set of base stations is determined through a set of UL performance metrics.

29. The device of claim 27, wherein the predetermined set of base stations is determined through a set of on DL channel quality indicator measurement reports.

30. The device of claim 27, wherein the generated load indicator is determined for a set of frequency resources.

31. The device of claim 23, wherein the reporting policy comprises a comparison of the first UL interference metric with a threshold value.

32. The device of claim 23, wherein the reporting policy comprises a response to a request to receive a load indicator.

33. The device of claim 23, wherein the reporting policy comprises reporting a load indicator message periodically.

34. The device of claim 23, wherein to generate the first UL interference metric includes to measure an UL signal.

35. The device of claim 34, wherein to measure an UL signal includes a measurement of interference over thermal noise.

36. The device of claim 24, the processor further configured to infer a source of interference based at least in part on a set of DL channel quality reports, a set of scheduled time-frequency resources, or a set of load indicators.

37. The apparatus of claim 23, wherein the third UL metric is obtained prior to generating the first UL metric.

38. An apparatus that operates in a wireless environment, the apparatus comprising:
- means for receiving an uplink (UL) signal;
- means for determining a first UL interference metric;
- means for determining whether to generate a load indicator based at least in part on the first UL interference metric and a reporting policy, wherein determining whether to generate a load indicator comprises evaluating a difference between the first UL interference metric and a third UL interference metric;
- means for generating the load indicator when it is determined to generate the load indicator;
- means for conveying a set of the generated load indicators through a backhaul communication wired link;
- means for receiving a set of load indicators from a set of neighboring base stations through the backhaul communication wired link; and
- means for scheduling a set of communication resources according to the received set of load indicators to mitigate a second UL interference metric.

39. The apparatus of claim 38, further comprising means for receiving a set of downlink (DL) channel quality reports.

40. The apparatus of claim 39, further comprising means for establishing a set of neighbor base stations.

41. The apparatus of claim 38, wherein the means for determining the first UL interference metric further comprises means for measuring interference over thermal noise.

42. The apparatus of claim 38, wherein the reporting policy includes at least one of an event-based policy or a time-frequency policy.

43. The apparatus of claim 42, wherein a time-frequency policy includes reporting periodically.

44. The apparatus of claim 38, wherein the third UL metric is obtained prior to generating the first UL metric.

45. A computer program product comprising a non-transitory computer-readable medium, comprising:
- code for causing at least one computer to determine a first uplink (UL) interference metric;
- code for determining whether to generate a load indicator based at least in part on the first UL interference metric and a reporting policy, wherein determining whether to generate a load indicator comprises evaluating a difference between the first UL interference metric and a third UL interference metric;
- code for generating the load indicator when it is determined to generate the load indicator;
- code for causing the at least one computer to convey a set of the generated load indicators through a backhaul communication wired link;
- code for causing the at least one computer to receive a set of load indicators from a set of neighboring base stations through the backhaul communication wired link; and
- code for causing the at least one computer to schedule a set of communication resources according to the received set of load indicators to mitigate a second UL interference metric.

46. The non-transitory computer-readable medium of claim 45, further comprising code for causing the at least one computer to infer a reporting policy that optimizes load indicator traffic through the backhaul communication wired link.

47. The non-transitory computer-readable medium of claim 46, wherein the code for causing at least one computer to determine the first UL interference metric includes code for causing the at least one computer to determine interference over thermal noise.

48. The non-transitory computer-readable medium of claim 45, wherein the third UL metric is obtained prior to generating the first UL metric.

* * * * *